United States Patent

[11] 3,593,737

[72] Inventor George H. Higgins
  Leamington Spa, England
[21] Appl. No. 837,686
[22] Filed June 30, 1969
[45] Patented July 20, 1971
[73] Assignee Coventry Climax Engines Limited
  Coventry, England

[54] LIQUID-MIXING SYSTEMS
  8 Claims, 1 Drawing Fig.
[52] U.S. Cl. ............................................. 137/100
[51] Int. Cl. ........................................... G05d 11/02
[50] Field of Search ............................. 137/98, 99, 100

[56] References Cited
  UNITED STATES PATENTS
  2,670,940  3/1954  Hunt ........................... 137/99
  3,030,974  4/1962  Arenhold ................... 137/100
  3,047,003  7/1962  Gurney ....................... 137/100

Primary Examiner—Laverne D. Geiger
Assistant Examiner—William H. Wright
Attorney—Holcombe, Wetherill & Brisebois ABSTRACT: A system is disclosed for the continuous mixing of two liquids in predetermined proportions. The system has a governor and a first orifice plate flow meter through both of which the first liquid flows to a point where it is mixed with the second liquid, the governor having a movable closure member which, as it moves from an open to a closed position progressively reduces the flow of the first liquid through the governor. A pressure difference developed across the first flow meter is conducted to a diaphragm in the governor which acts in response to the flow the first liquid to bias the closure member towards its closed position with a force which increases as the flow rate of the first liquid increases. The mixed liquids pass a second orifice plate flow meter across which a pressure difference is developed and is conducted to a second diaphragm in the closure member. The second diaphragm acts to bias the closure member towards its open position with a force which increases as the flow of the mixed liquids increases. The closure member adopts an equilibrium position under the influence of the two biasing forces.

PATENTED JUL 20 1971 3,593,737
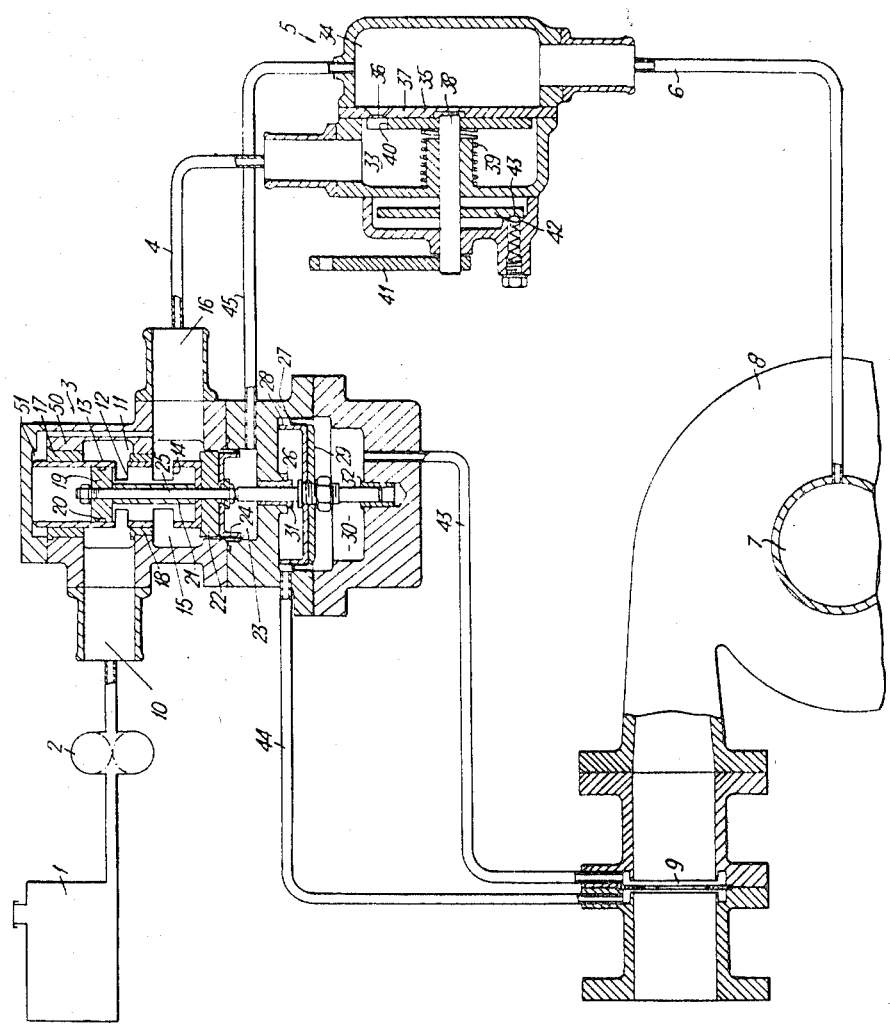
Inventor
G. H. HIGGINS
By
Holcombe, Wetherill & Brisebois
Attorneys

LIQUID-MIXING SYSTEMS

This invention relates to the continuous mixing of liquids in predetermined proportions in circumstances in which the proportions must be kept constant in spite of variations in the volume flow of one of the liquids.

In accordance with the invention a system for the continuous mixing of two liquids in predetermined porportions has a governor and a first flow-measuring device through both of which, in use, the first liquid flows to a point where it is mixed with the second liquid, the governor having a movable closure member which, as it moves from an open to a closed position progressively reduces the flow of the first liquid through the governor and the first flow-measuring device acting on the governor in response to the flow of the first liquid to bias the closure member toward its closed position with a force which increases as the flow rate of the first liquid increases, and a second flow-measuring device through which, in use, the second liquid or the mixture flows and which, in response to the flow of the second liquid or the mixture, acts on the governor to bias the closure member towards its open position with a force which increases as the flow of the second liquid increases, the closure member adopting an equilibrium position under the influence of the two biasing forces, whereby the relative porportions of the two liquids when mixed is substantially constant irrespective of changes in the flow rate of the second liquid.

The point at which the liquids are mixed may be either upstream or downstream from the second measuring device since the proportion of the first liquid can be kept constant with respect either to the two mixed liquids or, equally well, to the second liquid alone, but preferably the mixing takes place at a point where the pressure of the second liquid is conveniently low, as for example, at the inlet of a pump for the second liquid.

The system is particularly suitable for producing foam for extinguishing fires, in which case the first liquid is a concentrated foam compound and the second liquid is water.

Preferably, each of the flow-measuring devices is an orifice plate, a pressure difference being developed across the plate according to the flow through the orifice and in each case, the pressure difference is applied to a separate diaphragm or piston in the governor which, in turn, acts on the closure member to provide the biasing action.

So that the porportions in which the two liquids are mixed can be varied, the area of the orifice through which the first liquid flows may be variable, and preferably there are several orifices in an orifice plate of the first measuring device and a movable part by which the orifices can be successively covered, the position of the movable part, and hence the number of orifices left uncovered being chosen according to the fixed porportions in which the two liquids are to be mixed.

One example of a system according to the invention, for mixing concentrated foam compound with water to produce foam for extinguishing fires is illustrated in the accompanying drawing in which some parts of the system are shown in sectional elevation and other parts are shown diagrammatically.

Concentrated foam compound forming the first liquid is stored in a tank 1 from which it is drawn by a pump 2 and delivered to a governor 3. The foam compound passes from the governor along a pipe 4 to a first measuring device 5 and then along another pipe 6 to an inlet 7 of a water pump 8, the compound water forming the second liquid. The mixed foam compound and water are delivered by the pump through an orifice plate 9 which forms a second measuring device and are eventually aerated to produce foam.

The foam compound enters the governor 3 through an inlet 10 and passes in turn into a first chamber 11, through a pair of ports 12 formed in a hollow sleeve 13 into the interior of the sleeve, through two further ports 14 and into an outlet chamber 15, finally leaving the governor through an outlet 16.

The sleeve 13 is free to slide through two fixed bushes 17 and 18 and forms part of an assembly which also includes a piston and sealing ring 19 and 20, a spacer collar 21, a pad 22, a flexible roll diaphragm 23, which is trapped between the pad 22 and a cup washer 24, and a tie rod 25 which holds the whole assembly rigidly together.

The sleeve 13 is shown in the drawing in its uppermost position in which the ports 12 are clear of the bush 18. As the sleeve slides downwards, the ports 12 are progressively covered by the bush 18 to throttle the flow of foam compound passing into the interior of the sleeve which acts as a movable closure member. Some throttling also takes place at the outlet parts 14 so that the pressure in the sleeve is higher than in the outlet chamber 15. The pressure in the sleeve however acts both upwards on the piston 19 and downwards on the closed lower end of the sleeve so that its net action on the sleeve assembly is nil.

The diaphragm 23 divides the outlet chamber 15 into two parts and a push rod 26 projects upwards into the lower part and bears against the lower end of the rod 25. The push rod 26 carries a second flexible roll diaphragm 27 between two washers 28 and 29 in a third chamber 30 which is divided into upper and lower parts by the diaphragm 27. The push rod 26 is slidably mounted in two bushes 31 and 32.

The first measuring device 5 has an inlet chamber 33 and an outlet chamber 34 separated by an orifice 35, formed with seven orifices 36 of which one is shown. The orifices are arranged adjacent to one another with their centers lying on a circular arc and can be progressively covered by a rotatable plate 37 rigidly mounted on a shaft 38 and urged against the orifice plate 35 by a coil spring 39. The plate 37 is circular apart from a portion 40 which is recessed radially inwards and extends far enough round the plate to expose all the orifices 36 when the plate 37 is rotated into a suitable position. As the plate 37 is rotated away from this position, the orifices are progressively covered. The number of orifices exposed can therefore be chosen as desired.

In order to rotate the plate 37, the shaft projects outside the governor 5 where it carries a handle 41. The shaft also carries a disc 42 formed with a number of recesses which can be engaged by a spring-loaded ball 43 to locate the shaft, and therefore the plate 37, in any one of a series of positions in which exactly the desired number of orifices 36 is exposed, no orifice being half covered an half uncovered.

As foam compound flows from the inlet chamber 33 to the outlet chamber 34 a pressure difference is developed between the two chambers dependent upon the number of orifices exposed and the volume flow of foam compound. In just the same way a pressure difference is developed across the orifice 9 dependent upon the volume flow of mixed foam compound and water passing through the orifice. The pressure difference across the orifice 9 is conducted through two tubes 43 and 44 to the chamber 30 divided by the flexible diaphragm 27, the high pressure, upstream side of the orifice being connected to the lower part of the chamber so that there is a pressure difference urging the diaphragm upwards. The pressure difference across the orifice 9 therefore acts to bias the sleeve 13 upwards towards the position shown in which the ports 12 are unobstructed.

The pressure difference developed across the orifices 36 is applied through two pipes 4 and 45 across the diaphragm 23. The high-pressure, inlet side 33 of the orifices is connected both to the part of the chamber 15 above the diaphragm and outside the sleeve 13 and, through a passage 50 to a chamber 51 above the piston 19. The higher pressure therefore acts downwards on two areas which are together equal to the area beneath the sleeve assembly on which the lower pressure acts upwards. The pressure difference therefore acts on the diaphragm 23 to bias the sleeve assembly downwards a position in which the ports 12 are covered by the bush 18 and the flow of foam compound is reduced. The biasing actions exerted by the two diaphragms on the sleeve 13 are therefore opposed to one another.

In operation of the system the sleeve 13 takes up an equilibrium position in which the ratio between the flows of foam compound and water is such that the two diaphragms exert equal and opposite biasing forces on the sleeve. If the flow of water then increases, the pressure difference across the orifice 9 and therefore across the diaphragm 43 will increase, resulting in an increase in the upward bias applied by the diaphragm 27 to the sleeve and causing the sleeve to move upwards. The upward movement increases the flow of foam compound, and consequently the pressure difference developed across the orifice 36 and applied across the diaphragm 23 is also increased. The increased downward bias applied by the diaphragm 23 to the sleeve will again balance the increased upward bias of the diaphragm 27 when the sleeve has moved far enough for the flow of foam compound to have increased in proportion to the increased water flow.

The two constant proportions in which the foam compound and water are mixed depend on the areas of the two diaphragms, of the orifice 9 and of the orifices 36 and the number exposed. In this example the areas are chosen so that, with one orifice 36 exposed the proportion of foam compound in the mixture passing the orifice 9 is 1 percent. The percentage of foam compound in the mixture is therefore numerically equal to the number of orifices 36 exposed.

I claim:

1. A system for the continuous mixing of first and second liquids in predetermined proportions, said system comprising a governor adapted to pass said first liquid, a first flow-measuring device also adapted to pass said first liquid, a movable closure member of said governor adapted, upon moving from an open to a closed position, to progressively reduce the flow of said liquid through said governor, said first flow-measuring device being operably connected to said governor whereby in response to said flow of said first liquid said closure member is biased towards its closed position with a force which increases as said flow rate of said first liquid increases, and a second flow-measuring device adapted to pass at least the second liquid and being operably connected to said governor whereby in response to the flow of said second liquid said closure member is biased towards its open position with a force which increases as said flow of said second liquid increases, said closure member adopting an equilibrium position under the influence of said biasing forces, whereby the relative proportions of said first and second liquids when mixed are substantially constant irrespective of changes in the flow rate of said second liquid.

2. A system according to claim 1 in which said second flow-measuring device is adapted to pass said second liquid after it is mixed with said first liquid.

3. A system according to claim 1, in which each of said flow-measuring devices comprises an orifice plate adapted to develop a pressure difference according to the flow through said orifice, and said governor includes two pressure-sensitive devices, and means are provided for connecting said pressure difference of a first of said orifice plates with a first of said pressure-sensitive devices and for connecting said pressure difference of a second of said two orifice plates with a second of said pressure-sensitive devices.

4. A system according to claim 3, including means for varying the area of said orifice through which the first liquid flows, whereby said predetermined proportions in which said two liquids are mixed can be varied.

5. A system according to claim 4 in which said orifice plate of said first measuring device defines a plurality of orifices and movable means are provided for successively covering said plurality of orifices whereby the position of the movable means and hence the number of orifices left uncovered, may be chosen according to the constant proportions in which the two liquids are to be mixed.

6. A system according to claim 1, in which said closure member is a closed ended hollow sleeve defining entry ports through which said first liquid flows into the interior of the sleeve and exit ports through which said first liquid flows from said interior of the sleeve, and said system further comprises means slidably mounting said sleeve whereby said sleeve is slidable from a position in which entry ports are unobstructed to a position in which said entry ports are covered and the pressure of said first liquid within the interior of said sleeve acts with equal and opposite forces on the two closed ends of the sleeve.

7. A system according to claim 6, in which said first liquid is concentrated foam compound and said second liquid is water.

8. A system according to claim 7, including a pump having an inlet at which said first and second liquids are mixed.